UNITED STATES PATENT OFFICE.

CHARLES L. PEPPER, OF CHICOPEE FALLS, MASSACHUSETTS, ASSIGNOR TO THE OVERMAN WHEEL COMPANY, OF SAME PLACE.

SEAT FOR CYCLE-SADDLES.

SPECIFICATION forming part of Letters Patent No. 515,966, dated March 6, 1894.

Application filed October 23, 1893. Serial No. 488,851. (No model.)

*To all whom it may concern:*

Be it known that I, CHARLES L. PEPPER, of Chicopee Falls, in the county of Hampden and State of Massachusetts, have invented a new Improvement in Seats for Cycle-Saddles; and I do hereby declare the following, when taken in connection with accompanying drawings and the letters of reference marked thereon, to be a full, clear, and exact description of the same, and which said drawings constitute part of this specification, and represent, in—

Figure 1:
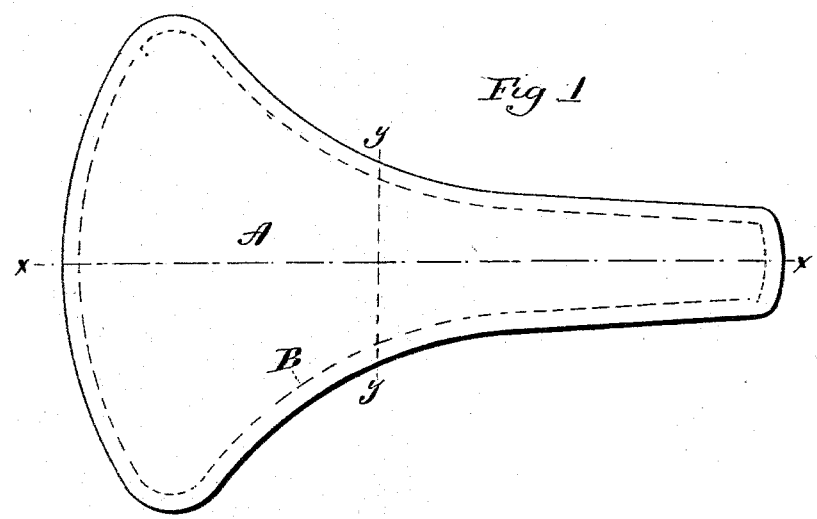
Figure 2:
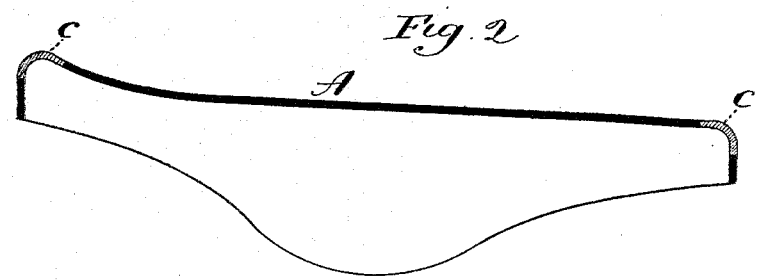
Figure 3:
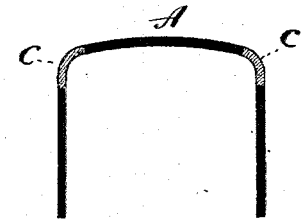

Figure 1, a plan view of one form which a saddle constructed in accordance with my invention may assume; Fig. 2, a view thereof in central longitudinal section on the line x—x of Fig. 1; Fig. 3, a view in transverse section on the line y—y of the same figure.

My invention relates to an improvement in the seats of that class of saddles known as suspension saddles, which are saddles in which the seat is suspended by its forward and rear ends, leaving it entirely unsupported between those points.

Heretofore, the seats of saddles of this class have generally been made of leather, and have been objectionable particularly on account of their liability to stretch, and lose their shape. In many saddles of this class, provision is made for moving the forward or rear seat-support or both so as to take up the stretch in the seat, but often-times the seat will stretch beyond the capacity of the supports for adjustment. Riders of these saddles are often put to great discomfort and inconvenience by the wetting of the seats when the saddles are exposed out of doors to rain or moisture. When a saddle seat is wet, it stretches and distorts, putting the rider to the bother of adjusting it, if happily it is adapted to be adjusted. The distortion of the seat cannot, however, be overcome. In any event, the wet leather is sticky and clinging, and not only uncomfortable and disagreeable, but also it hampers the rider and retards his progress, as it interferes with the freest movements of his legs. If the seat stretches and distorts very much, particularly if not adjustable, it may thereby become not merely injurious in its effect upon the rider's person, but, in addition, unsafe. Leather seats for suspension saddles are also objectionable, because they absorb perspiration, whereby some riders are put to discomfort and annoyance, and from that cause alone saddle-seats are often wet enough to make them distort and stretch. Furthermore, between stretching and distorting, and soiling, a leather seat soon looks shabby, and cannot be freshened up by any refinishing.

The object of my invention is to avoid the objections above recited, and to secure a seat for suspension saddles which will never stretch nor distort, which will always afford a safe, comfortable and healthful seat of good appearance for the rider, which he may expose to rain or moisture with impunity, which will not absorb perspiration, and which enables the rider to work to the greatest advantage as far as his seat is concerned.

With these ends in view, my invention consists in a waterproof seat for suspension saddles, composed of fabric and rubber, differentially vulcanized in the shape required.

My invention further consists in a waterproof saddle seat, composed of fabric and rubber and vulcanized in the required shape, the vulcanization being differential so as to make the rounded edges or corners of the seat harder than other portions of it.

I have thought it sufficient for the illustration of my invention to simply show and describe the seat alone, inasmuch as the seat-supports and other details of suspension saddles are perfectly well known to those familiar with this art.

The seat A, herein shown, is of the usual form, being rounded at its extreme rear end, and tapered forward to form a long neck or front, which is lower than its rear end, and having depending flaps on each side. This seat may be formed in a variety of ways, dependent upon the character of the fabric and rubber used, and upon the shape, weight, and style of the seat to be produced. It may be formed, for instance, by cutting out blanks of fabric saturated with rubber, then laying them together, and finishing the edge of the unshaped seat, and then exposing the same to heat in a two-part mold, shaped according to the shape of the seat to be produced. When the article comes from the mold, it will be complete, except for superficially finishing (No Model.)

C. L. PEPPER.
SEAT FOR CYCLE SADDLES.

No. 515,966. Patented Mar. 6, 1894.

Witnesses
J. H. Shuman
Harry A. Beebe

Charles L. Pepper.
Inventor
By attys.
Earle Seymour